United States Patent [19]

Springer

[11] Patent Number: 4,745,187

[45] Date of Patent: May 17, 1988

[54] PROCESS FOR THE PREPARATION OF WATER-SOLUBLE PHTHALOCYANINE DYESTUFFS

[75] Inventor: Hartmut Springer, Königstein/Taunus, Fed. Rep. of Germany

[73] Assignee: Hoechst Aktiengesellschaft, Frankfurt am Main, Fed. Rep. of Germany

[21] Appl. No.: 8,300

[22] Filed: Jan. 29, 1987

[30] Foreign Application Priority Data

Feb. 1, 1986 [DE] Fed. Rep. of Germany ....... 3603124

[51] Int. Cl.$^4$ ................. C09B 47/08; C09B 47/20
[52] U.S. Cl. ............................ 540/123; 540/124; 540/125; 540/126; 540/127; 540/128; 540/132; 540/133; 540/134
[58] Field of Search ............... 540/123, 124, 125, 126, 540/127, 128, 132, 133, 134

[56] References Cited

U.S. PATENT DOCUMENTS

| | | | |
|---|---|---|---|
| 4,237,050 | 12/1980 | Springer | 540/134 X |
| 4,350,632 | 9/1982 | Springer | 540/134 |
| 4,576,755 | 3/1986 | Mischke et al. | 540/132 |

FOREIGN PATENT DOCUMENTS

| | | |
|---|---|---|
| 0043561 | 1/1982 | European Pat. Off. . |
| 0075905 | 4/1983 | European Pat. Off. . |
| 2024837 | 1/1980 | United Kingdom . |

*Primary Examiner*—Richard L. Raymond

[57] ABSTRACT

Water-soluble phthalocyanine dyestuffs having vinylsulfonyl or β-substituted ethylsulfonyl groups are prepared by reaction of phthalocyanine sulfonyl chlorides, which may contain sulfo groups, with a primary or secondary amine having vinylsulfonyl or β-substituted ethylsulfonyl groups and, if appropriate, with a second primary or secondary amine of the aliphatic, heterocyclic or aromatic series, in the presence of a pyridinesulfonamide or pyridinecarboxamide.

12 Claims, No Drawings

PROCESS FOR THE PREPARATION OF WATER-SOLUBLE PHTHALOCYANINE DYESTUFFS

British Patent Application No. 2,024,837 A discloses processes for the preparation of water-soluble phthalocyanine dyestuffs by reaction of phthalocyaninesulfonyl chlorides which contain sulfo groups with a primary or secondary aromatic amine, such as an amine from the aniline and naphthylamine series, which contains one or more $\beta$-substituted ethylsulfonyl groups or one or more vinylsulfonyl groups, and, if desired, with a second primary or secondary amine of the aliphatic, heterocyclic or aromatic series, in which, in order to improve the process, the reaction is carried out in the presence of a pyridinesulfonic acid or a pyridinecarboxylic acid in place of pyridine. These known processes are advantageous inasmuch as toxic and foul-smelling pyridine can be dispensed with when they are used and instead, for example, the toxicologically and ecologically acceptable nicotinic acid may be used.

However, these processes of GB-A-No. 2,024,837, as has become apparent in the meantime, still have problems which set certain limits on the industrial utilization. Thus, it is necessary, according to experience, to carry out the condensation reaction between the phthalocyaninesulfonyl chlorides and the amines at elevated temperature, compared to the process catalyzed by pyridine, since the condensation proceeds at room temperature so slowly that it becomes uneconomic as an industrial process due to the inadequate space/time yield. However, higher reaction temperatures in the reaction in aqueous medium cause the competing hydrolysis of sulfochloride groups to be likewise accelerated, due to which phthalocyaninesulfonic acids are formed to a greater extent and the reaction leads to a reactive dyestuff product with inadequate fixing capacity, and thus does not proceed in an ideal fashion.

In order to carry out the condensation reaction in a satisfactory fashion without increasing the temperature, there was therefore a demand for a catalyst which accelerates the reaction at room temperature with a satisfactory space/time yield.

It has now been found that such catalysts, in a surprising fashion, are pyridinesulfonamides and pyridinecarboxamides, since a process fashion which works significantly more economically is made possible using these compounds for the preparation of such phthalocyanine dyestuffs.

The present invention thus relates to an improved process for the preparation of water-soluble phthalocyanine dyestuffs by reaction of a phthalocyaninesulfonyl chloride, which may contain sulfo groups, or a mixture thereof, with a primary or secondary amine, preferably an aromatic amine, particularly from the aniline and naphthylamine series, which contains one or more, preferably one or two, $\beta$-substituted ethylsulfonyl groups or one or more, preferably one or two, vinylsulfonyl groups, and with or without a second primary or secondary amine of the aliphatic, heterocyclic or aromatic series, which comprises carrying out the reaction in the presence of a pyridinesulfonamide or a pyridinecarboxamide or a mixture of such compounds.

Phthalocyanine dyestuffs which may be prepared by this improved process are disclosed, for example, in German Patent Nos. 1,179,317, 1,235,466, 1,289,218 and 1,283,997, and U.S. Pat. Nos. 3,062,830 and 4,033,980, and also the abovementioned GB-A-No. 2,024,837.

The present invention particularly relates to an improved process for the preparation of fiber-reactive phthalocyanine dyestuffs in the presence of a pyridinesulfonamide or a pyridinecarboxamide or a mixture of such compounds, in which process phthalocyaninesulfonyl chlorides, which may contain sulfo groups, are reacted with a primary or secondary amine, preferably an aromatic amine, particularly from the aniline or naphthylamine series, which contains one or two, preferably one, $\beta$-hydroxyethylsulfonyl, $\beta$-chloroethylsulfonyl, $\beta$-acetoxyethylsulfonyl, $\beta$-sulfatoethylsulfonyl, $\beta$-thiosulfatoethylsulfonyl or $\beta$-phosphatoethylsulfonyl or vinylsulfonyl group(s), and, if desired, with a second primary or secondary amine of the aliphatic, heterocyclic or aromatic series.

The $\beta$-substituted ethylsulfonyl group(s) or vinylsulfonyl group(s) contained in the amine can be bonded to the aromatic carbocyclic or aromatic heterocyclic nucleus of the amine directly or via a bridging member, such as, for example, an alkylene group having one to six carbon atoms, preferably two to four carbon atoms, or an amido group or an alkylamino group having an alkyl radical, having one to four carbon atoms, which may be substituted, for example, by a phenyl radical, a cyano, hydroxy or alkoxy group having one to four carbon atoms or an alkanoyloxy group having two to five carbon atoms.

The condensation reactions of the phthalocyaninesulfonyl chlorides with the amines are carried out at a pH of 3.5 to 8.5, preferably 4 to 8, particularly preferably between 5 and 7, with addition of an acid-binding agent, such as an alkali metal or alkaline earth metal hydroxide or an alkaline-reacting alkali metal or alkaline earth metal salt of inorganic or organic acids; when adding these acid-binding agents, it should be noted that they are added such that a pH of 8.5, particularly 8, is not exceeded.

The condensation reactions according to the invention may be carried out at a temperature between 0° and 60° C. The reaction is preferably carried out at a temperature between 10° and 35° C. The reaction according to the invention may also be carried out in an industrially advantageous manner below 35° C., such as, for example, at a temperature between 15° and 30° C.

The invention preferably relates to the preparation of phthalocyanine dyestuffs of the general formula (1) defined below

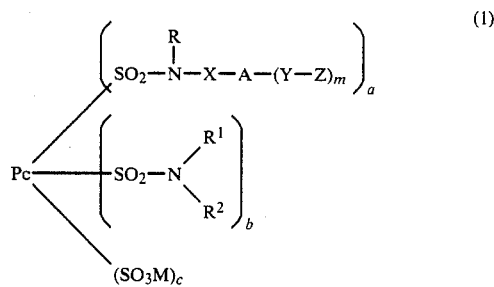

by reacting a phthalocyaninesulfonyl chloride of the general formula (2) defined below

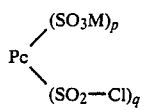 (2)

or a mixture thereof in aqueous medium simultaneously or in any sequence with an amine of the general formula (3) defined below

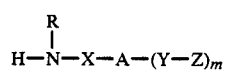 (3)

and, if appropriate, with a further amine of the general formula (4), defined below

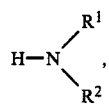 (4)

with or without simultaneous partial hydrolysis of the sulfochloride groups to sulfo groups, and subsequent hydrolysis if sulfochloride groups are still present, and carrying out the condensation reactions of the phthalocyaninesulfonyl chlorides of the general formula (2) with the amines of the general formula (3) and, if appropriate, (4) according to the invention in the presence of a pyridinesulfonamide or a pyridinecarboxamide or a mixture thereof.

In the formulae (1), (2), (3) and (4) above, the various parts of the formulae have the following meanings:

Pc is the radical of the metal-free or a metal-containing phthalocyanine, such as, for example, the copper, cobalt or nickel phthalocyanine, where the phthalocyanine radical may be further substituted in the 3and/or 4-positions of the carbocylic aromatic rings of the phthalocyanine, such as, for example, by halogen atoms, such as chlorine atoms, or aryl radicals, such as phenyl radicals, and in which the sulfochloride, sulfonamide and/or sulfo groups are bonded in the 3and/or 4-positions of the carbocyclic aromatic rings of the phthalocyanine;

R is a hydrogen atom or a lower aliphatic radical, particularly a lower alkyl group, which may be substituted;

R¹ and R² each denote a hydrogen atom or a lower alkyl group which may be substituted, or an aryl radical which may be substituted, or R¹ and R², together with the nitrogen atom and an alkylene radical having three to eight carbon atoms, preferably four to six carbon atoms, or with a further hetero atom, such as a nitrogen atom or an oxygen atom, and two lower alkylene radicals form the radical of a four- to eight-membered heterocyclic ring, such as, for example, the piperidino, piperazino or morpholino radical;

A is an aromatic, carbocyclic or aromatic heterocyclic radical, preferably an optionally substituted phenylene or naphthylene radical, particularly a phenylene or naphthylene radical, which may both be substituted by one to four substituents from the group comprising lower alkyl, such as methyl and ethyl, lower alkoxy, such as methoxy and ethoxy, halogen, such as chlorine and bromine, carboxy, nitro and sulfo; X is a direct bond or a divalent organic linking member, such as, for example, an alkylene radical having one to six carbon atoms or an alkylene amino group having an alkyl radical having one to six carbon atoms, in which its amino group may be further substituted by an optionally substituted alkyl radical, or, for example, a radical of the formula

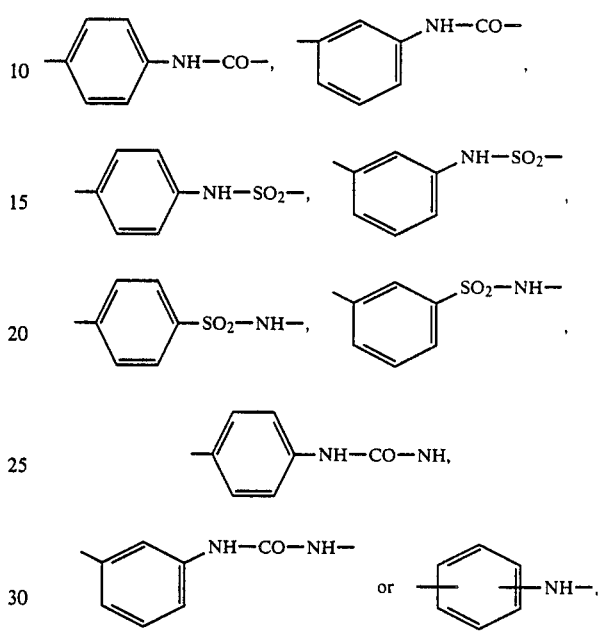

of these preferably a radical of the formula

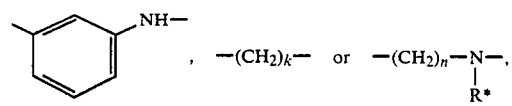

in which k denotes an integer from 1 to 5, n denotes an integer from 2 to 6, and R* denotes a hydrogen atom or an alkyl group having 1 to 5 carbon atoms, or X together with the —N(R)— group forms a radical of the general formula (5)

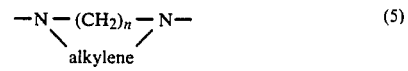 (5)

in which n has the abovementioned meaning and alkylene represents a lower alkylene radical;

Y is a direct bond or a group of the formula

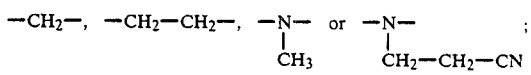 ;

Z is the β-hydroxyethylsulfonyl, β-chloroethylsulfonyl, β-acetoxyethylsulfonyl, β-thiosulfatoethylsulfonyl, β-phosphatoethylsulfonyl or the vinylsulfonyl group, preferably the β-sulfatoethylsulfonyl group;

a is an integer from 1 to 4;

b is an integer from 0 to 3;

c is an integer from 0 to 3, where a, b and c may be identical to or different from one another, but the sum of (a+b+c) is a maximum of 4;

p is an integer from 0 to 3;

q is an integer from 1 to 4, where p and q may be identical to or different from one another, but the sum of (p+q) is a maximum of 4;

m is the number 1 or 2; and

M is a hydrogen atom or alkali metal, such as sodium, potassium or lithium.

The formula members may have meanings which are identical to one another or different from one another.

A sulfo group is a group of the general formula —$SO_3M$, where M has the abovementioned meaning; in the same manner, a carboxy group is a group of the general formula —COOM, a sulfato group is a group of the general formula —$OSO_3M$, a thiosulfato group is a group of the general formula —S—$SO_3M$, and a phosphato group is a group of the general formula —O—$PO_3M_2$, where M in each case has the abovementioned meaning.

In particular, the invention preferably relates to the preparation of phthalocyanine dyestuffs of the general formula (1), in which the formula index b denotes the number 0, Y is a direct bond, the formula index m represents the number 1, Z denotes the β-sulfatoethylsulfonyl group, and Pc, R, A, M, a and c have the abovementioned meanings, where the sum of (a+c) equals a number from 2 to 4, by reaction of a phthalocyaninesulfonyl chloride of the general formula (2) or a mixture thereof with an amine of the general formula (3), in which R, X and A have the abovementioned meanings, Y denotes a direct bond, m represents the number 1, and Z represents the β-sulfatoethylsulfonyl group, under the process conditions according to the invention. In particular, the preparation according to the invention of phthalocyanine dyestuffs corresponding to the general formula (1a)

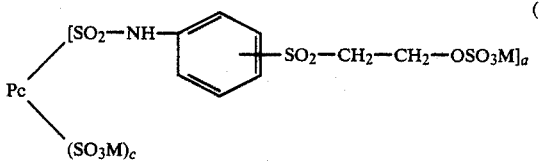

in which Pc, a and c have the abovementioned meanings, where the sum of (a+c) is a number from 2 to 4, is preferred of these.

The fiber-reactive phthalocyanine dyestuffs which can be prepared according to the invention are generally obtained in the form of their salts, such as the alkali metal salts, and are used as such for dyeing fiber materials. Similarly, the compounds of the general formula (3) are preferably employed in the form of their salts, such as alkali metal salts, in the condensation reaction according to the invention.

The fiber-reactive phthalocyanine dyestuffs which can be prepared according to the invention, such as, for example, the dyestuffs of the general formula (1), are generally obtained in the form of mixtures of the individual compounds, such as, for example, the individual compounds of the general formula (1), these individual compounds differing from one another by the degree of substitution of the sulfo groups and sulfonamide groups on the phthalocyanine radical, in the example of the general formula (1) by the degree of substitution of the radicals labeled with the indices a, b and c. In the example of the general formula (1), the indices a, b and c are generally fractions in the representation of the formula of the process product (fiber-reactive phthalocyanine dyestuff) obtained.

The description "lower" used above and below denotes that the groups designated therewith contain or are alkyl radicals or alkylene radicals having one to four carbon atoms. The aliphatic radicals and the aryl radicals of the formula elements R, $R^1$ and $R^2$ may, as stated, contain substituents. In the alkyl radicals, preferably lower alkyl groups, the substituents are preferably hydroxy, sulfo, carboxy and phenyl, these alkyl radicals, if substituted, preferably containing one or two such substituents. Aryl radicals are preferably optionally substituted phenyl radicals; the aryl radicals may preferably be substituted by one or two substituents from the group comprising methyl, chlorine, carboxy and sulfo.

The pyridinesulfonamides or pyridinecarboxamides used according to the invention in the condensation reactions are, in particular, derived from pyridinemonosulfonic acid, pyridinedisulfonic acid and pyridinetrisulfonic acid, pyridinemonocarboxylic acid, pyridinedicarboxylic acid and pyridinetricarboxylic acid, and furthermore from their derivatives which are substituted in the heterocycle by non-ionogenic substituents, such as, for example, methyl- and ethyl-substituted pyridine sulfonic acids or pyridinecarboxylic acids. Such pyridine compounds used according to the invention are, for example, pyridine-2-sulfonamide, pyridine-3-sulfonamide, pyridine-4-sulfonamide, pyridine-2-carboxamide, pyridine-3-carboxamide, pyridine-4-carboxamide, pyridine-2,3dicarboxamide, pyridine-2,4-dicarboxamide, pyridine-2,5dicarboxamide, pyridine-2,6-dicarboxamide, pyridine-3,4dicarboxamide, pyridine-3,5-dicarboxamide, pyridine2,3,4-tricarboxamide, pyridine-2,4,5-tricarboxamide, 2-methylpyridine-3-sulfonamide, 4-methylpyridine-3-carboxamide, 4-ethylpyridine-3-carboxyamide, 6-methylpyridine-3-carboxamide, 4,6-dimethylpyridine-2-carboxamide, 2,6-dimethylpyridine-3-carboxamide and 2-methylpyridine-3,4-dicarboxamide. The use of pyridine-3carboxamide (nicotinamide), which is virtually nontoxic and odorless and which has proven excellently suited for the purpose specified here, is particularly preferred and advantageous.

The process according to the invention may be modified in a fashion such that before, during or after the actual condensation reaction(s), some of the sulfonyl chloride groups of the phthalocyanine starting compound, such as of the formula (2), are converted into sulfo groups by hydrolysis; thus, the condensation may be carried out, for example, by hydrolyzing some of the sulfonyl chloride groups simultaneously with the reaction of the amines, such as the amine (3) or the amines (3) and (4), or a procedure can be followed in which the reaction is carried out initially with an amount of amine, such as the amine of the formula (3) or the amines of the formulae (3) and (4), which is inadequate for complete reaction of all sulfonyl chloride groups, and the remaining sulfonyl chloride groups are subsequently hydrolyzed by means of a separate reaction step in acid to weakly alkaline medium, ie. at a pH between 1 and 8, if appropriate with warming, ie. at a temperature between 20° and 60° C.

Phthalocyanine starting compounds are, for example, sulfonyl chlorides or sulfo group-containing sulfonyl chlorides of the metal-free phthalocyanine, but preferably those of metal-containing phthalocyanines, for example, di-, tri- or tetrasulfonyl chlorides of copper phthalocyanine, cobalt phthalocyanine or nickel phthalocyanine, for example, copper phthalocyanine-3-disulfonyl chloride, copper phthalocyanine-3-trisulfonyl chloride, copper or nickel phthalocyanine-3-tetrasulfonyl chloride, cobalt phthalocyanine-3-trisulfonyl chloride, copper phthalocyanine-4-disulfonyl chloride or copper phthalocyanine-4-tetrasulfonyl chloride, copper phthalocyanine-3-disulfonyl chloride disulfonic acid, copper phthalocyanine-3-trisulfonyl chloride monosulfonic acid, and furthermore analogous sulfonyl chlorides which additionally contain other substituents, such as phenyl radicals and halogen atoms, on the phthalocyanine nucleus, for example, sulfonyl chlorides of copper tetraphenylphthalocyanine or nickel tetrachlorophthalocyanine. Such sulfonyl chlorides, such as corresponding to the general formula (2), are prepared by known processes, for example by the process of German Patent No. 891,121.

Amines having β-substituted ethylsulfonyl groups or vinylsulfonyl groups, such as those of the general formula (3), are, for example, β-hydroxyethyl 4-aminophenyl sulfone, β-hydroxyethyl 3-aminophenyl sulfone, β-hydroxyethyl 3-amino-4-methoxyphenyl sulfone, β-hydroxyethyl 4-(N-methylamino)phenyl sulfone, β-hydroxyethyl 3-methoxy-4-aminophenyl sulfone, β-hydroxyethyl 3-amino-4-methylphenyl sulfone, β-hydroxyethyl 3-amino-4-sulfophenyl sulfone, β-hydroxyethyl 3-bromo-4-aminophenyl sulfone, β-hydroxyethyl 3-amino-4-carboxyphenyl sulfone, β-hydroxyethyl 3-amino4-hydroxyphenyl sulfone, β-hydroxyethyl 3-hydroxy-4-aminophenyl sulfone, β-hydroxyethyl 2,5-dimethoxy-4-aminophenyl sulfone, β-hydroxyethyl 2-methyl-4-amino-5-methoxyphenyl sulfone, β-hydroxyethyl 4-aminonaphth-1-yl sulfone, β-hydroxyethyl 5-aminonaphth-1-yl sulfone, β-hydroxyethyl 6-aminonaphth-2-yl sulfone, β-hydroxyethyl 6-amino-5-sulfonaphth-2-yl sulfone, 2-amino-6,8-bis(β-hydroxyethylsulfonyl)naphthylene, β-hydroxyethyl 3-amino-4-methoxybenzylsulfone, β-hydroxyethyl β-(4-aminophenyl)ethyl sulfone, β-hydroxyethyl 7-aminonaphth-1-yl sulfone, β-hydroxyethyl 7-amino-3-sulfonaphth-1-yl sulfone, β-hydroxyethyl 3-nitro-4-(4'-aminophenylamino)phenyl sulfone, β-hydroxyethyl 3-(4'-aminobenzoylamino)-4-hydroxyphenyl sulfone, β-hydroxyethyl 3-(4-aminobenzoylamino)phenyl sulfone, β-hydroxyethyl 3-amino-4-hydroxy-5-nitrophenyl sulfone, β-hydroxyethyl 4-(3'-aminophenylsulfonylamino)phenyl sulfone, β-hydroxyethyl 4-(β-aminoethyl)phenyl sulfone, β-hydroxyethyl 4-(N-piperazino)phenyl sulfone, β-hydroxyethyl 4-(β-aminoethylamino)-3-nitrophenyl sulfone, β-hydroxyethyl 4-(3'-amino-4'-sulfophenylaminocarbonyl)phenyl sulfone, β-hydroxyethyl 4-(4'-amino-3'-sulfophenylaminocarbonyl)-phenyl sulfone, β-hydroxyethyl 4-(3'-amino-4'-sulfophenylaminosulfonyl)phenyl sulfone, β-hydroxyethyl 4-(3'-amino-4'-sulfoureido)phenyl sulfone, 3-N-(β-hydroxyethylsulfonyl)-N-(β-cyanoethyl) aminoaniline, 3-N-(β-hydroxyethylsulfonyl)methyl-6-methoxyaniline, 4-N-(β-hydroxyethylsulfonyl)-N-methyl aminoaniline and 3-β-(β'-hydroxyethylsulfonyl)ethylaniline, and also the corresponding derivatives thereof in which the β-hydroxyethyl group is replaced by a vinyl group or in which the hydroxy group of the β-hydroxyethyl radical is replaced by another substituent, preferably by a substituent which can be cleaved off under alkaline conditions, such as, for example, the sulfato, phosphato, thiosulfato or acetoxy group or the chlorine atom.

The other starting amines which may be employed in the process according to the invention, such as the amines of the general formula (4), are, for example, ammonia, methylamine, ethylamine, N-butylamine, benzylamine, aniline, ethanolamine, dimethylamine, diethylamine, diisopropylamine, N-methylbenzylamine, N-methylaniline, piperidine, morpholine, diethanolamine, 2-aminoethane-1-sulfonic acid, 2-aminoethane-1-carboxylic acid, 4-aminobenzenecarboxylic acid, 3-aminobenzenesulfonic acid or 4-aminobenzenesulfonic acid.

Acid-binding agents which are used in the process according to the invention are, for example, hydroxides, carbonates or bicarbonates, secondary and tertiary phosphates, borates and acetates of the metals of the first to third group of the periodic system, preferably the sodium and potassium compounds and also calcium compounds.

The process according to the invention is preferably carried out in aqueous medium. In order to improve the solubility of the starting and final products in the aqueous reaction medium, organic solvents, preferably amides of aliphatic carboxylic acid, such as dimethylformamide or N-methylpyrrolidone, may be added, if appropriate.

The dyestuff solution obtained when the condensation reaction is complete may—after appropriate standardization and, if appropriate, further addition of buffer substances—be employed directly, without further isolation of the dyestuff produced, as a liquid preparation for dyeing or printing fiber materials. However, if it is desired to obtain the resultant dyestuff in powder form, the isolation of the phthalocyanine dyestuffs obtained by the process described above may be carried out in a conventional fashion by salting out, for example using sodium or potassium chloride, and/or by acidification using a mineral acid or by evaporation of the neutral or weakly-acid aqueous dyestuff solutions, preferably at moderately elevated temperature or reduced pressure.

The phthalocyanine dyestuffs which can be obtained by the process according to the invention are suitable for dyeing and printing fiber materials made from wool, silk, linear nylons, but particularly of hydroxyl group-containing materials, such as cellulose, for example linen, regenerated cellulose and, above all, cotton, furthermore of leather, and supply very high quality, strong dyeings and prints, which are distinguished by very high wet fastnesses and very good light-fastnesses.

The dyeings are produced in a conventional fashion, such as, for example, as described in GB-A-No. 2,024,837.

The Examples below serve to illustrate the invention. The parts are parts by weight, the percentage data are percent by weight, unless otherwise stated. Parts by weight are to volume as the kilogramme is to the liter. The compounds described by means of the formula are specified in the form of the free acids; they are generally prepared and isolated in the form of their sodium or potassium salts and used for dyeing in the form of their salts. Likewise, the starting compounds and components mentioned in the Examples below, particularly tabulated Examples, in the form of the free acid, are employed in the synthesis as such or in the form of their salts, preferably alkali metal salts.

EXAMPLE 1

112 Parts of β-sulfatoethyl 4-aminophenyl sulfone are dissolved in 165 parts of water with addition of sodium bicarbonate at a pH of 6.5. 97 Parts of copper phthalocyanin-3-tetrasulfonyl chloride in the form of a moist filter cake are introduced with thorough stirring. 6.1 Parts of nicotinamide are then added. The reaction now starts slowly, and the pH is subsequently maintained at 6 to 6.5 by addition of sodium bicarbonate at a temperature of 20° to 25° C. The reaction is complete after about seven hours; bicarbonate is no longer taken up, and a clear, blue solution has been produced.

The dyestuff formed is isolated by evaporating this solution or by salting out. A salt-containing, turquoise-blue dyestuff is obtained whose constitution, according to the analysis, corresponds approximately to the formula

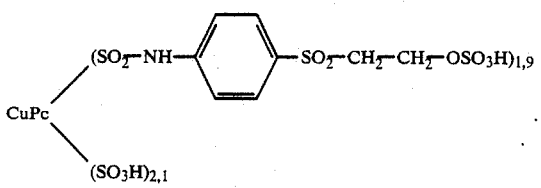

The dyestuff produces a bright turquoise-blue dyeing on cotton fabric in the presence of agents which have an alkaline effect.

EXAMPLE 1a (comparison example)

The process of Example 1 is repeated with the difference that 6.1 parts of nicotinic acid (in the form of the sodium salt) are employed as catalysts in place of 6.1 parts of nicotinamide. At 20° to 25° C., the reaction proceeds significantly more slowly than in Example 1 and is only complete after about 22 hours. The dyestuff produced has virtually the same composition and the same applicational properties as the product prepared in Example 1.

EXAMPLE 2

42.1 parts of β-sulfatoethyl 3-aminophenyl sulfone and 6.1 parts of nicotinamide are dissolved in 750 parts of water at room temperature with addition of sodium bicarbonate at a pH of 6.5. 97 Parts of copper phthalocyanine-3-tetrasulfonyl chloride in the form of a moist filter cake are introduced with thorough stirring. The reaction starts slowly and the pH of the reaction mixture is kept at 6.0 to 6.5 by sprinkling in sodium bicarbonate and the temperature is kept at 20° to 25° C. The reaction is complete after 23 hours. The dyestuff solution produced is filtered and then evaporated dryness at 60° C. under reduced pressure. A salt-containing, turquoise-blue dyestuff is obtained whose constitution, according to the analysis, corresponds approximately to the formula

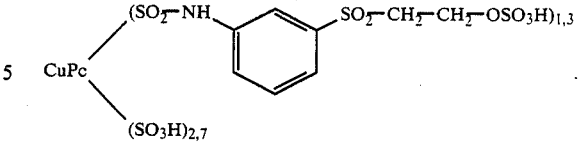

The dyestuff produces a bright turquoise-blue dyeing on cotton fabric in the presence of agents which have an alkaline effect; it corresponds in its properties to the dyestuff described in German Patent No. 1,179,317, Example 1.

EXAMPLE 2a (comparison example)

The process of Example 2 is repeated with the difference that 6.1 parts of nicotinic acid (in the form of the sodium salt) are employed as catalyst in place of 6.1 parts of nicotinamide. At room temperature, the reaction proceeds significantly more slowly than in Example 2 and is only complete after about 120 hours.

The dyestuff obtained has the same analytical composition and the same applicational properties as the product prepared in Example 2.

EXAMPLE 3

97 parts of nickel phthalocyanine-3-tetrasulfonyl chloride in the form of a moist filter cake are introduced into a neutral solution of 84.3 parts of β-sulfatoethyl 4-aminophenyl sulfone in 400 parts of water at room temperature with thorough stirring. 6.1 Parts of nicotinamide are then added and the temperature is kept at 20° to 25° C. and the pH at 6 to 6.5 by continuous addition of sodium bicarbonate during the reaction which only starts slowly. The reaction is complete after about 21 hours, and bicarbonate is no longer consumed. In order to isolate the dyestuff formed, the clear solution obtained is evaporated under reduced pressure. The dyestuff is produced in the form of a green-blue saltcontaining powder. It is easily soluble in water and fixes with alkalis to a high wash and light-fastness level on natural and regenerated cellulose fibers. It corresponds in its properties to the dyestuff known from German Patent No. 1,179,317, Example 6, and has, according to the analysis, the following constitution:

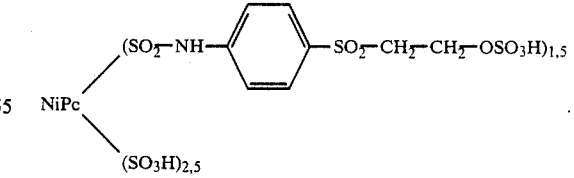

EXAMPLE 3a (comparison example)

The process of Example 3 is repeated but, in place of nicotinamide, the same quantity by weight of nicotinic acid (in the form of the sodium salt) is employed as catalyst. At room temperature, the reaction proceeds significantly more slowly than in Example 3 and is only complete after about 80 hours.

The dyestuff produced has virtually the same composition and the same applicational properties as the product prepared in Example 3.

I claim:

1. A process for the preparation of water-soluble phthalocyanine dyestuffs which contain one or more substituted ethylsulfonyl groups or one or more vinylsulfonyl groups, by reaction of a phthalocyaninesulfonyl chloride which may contain sulfo groups, or a mixture thereof with a primary or secondary amine which contains one or more β-substituted ethylsulfonyl groups or one or more vinylsulfonyl groups, and with, or in the absence of, a second primary or secondary amine of the aliphatic, heterocyclic or aromatic series, which consists essentially of carrying out the reaction in the presence of a pyridinesulfonamide or a pyridinecarboxamide or a mixture of such compounds.

2. The process as claimed in claim 1, wherein the pyridinecarboxamide is a pyridinemonocarboxamide.

3. The process as claimed in claim 1, wherein the pyridinecarboxamide is a nicotinamide.

4. The process as claimed in claim 1, wherein the reaction is carried out at a temperature between 15° and 30° C.

5. The process as carried out in claim 1, wherein sulfochloride groups are converted into sulfo groups simultaneously with the condensation reaction or subsequently.

6. The process as claimed in claim 1, wherein the β-substituted ethylsulfonyl group in the starting and final compounds is a β-hydroxyethylsulfonyl, β-chloroethylsulfonyl, β-acetoxyethylsulfonyl, β-sulfatoethylsulfonyl, β-thiosulfatoethylsulfonyl or β-phosphatoethylsulfonyl group.

7. A process for the preparation of a phthalocyanine dyestuff of the formula

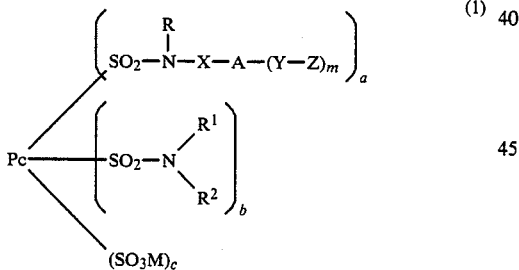

wherein
Pc is the radical of a metal-free or metal-containing phthalocyanine,
R is hydrogen or a substituted or unsubstituted lower aliphatic radical,
$R^1$ and $R^2$, which may be the same or different, each denote hydrogen or a substituted or unsubstituted lower alkyl, or a substituted or unsubstituted aryl, or $R^1$ and $R^2$, together with the nitrogen atom and an alkylene radical or with a further hetero-atom and two alkylene radicals form a 4- to 8- membered heterocyclic ring,
A is a substituted or unsubstituted aromatic carbocyclic or aromatic heterocyclic radical;
X is a direct bond or a divalent organic linking member, or X together with the -N(R)- group is the radical

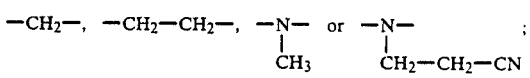

in which
n is a number 2 to 6 and alkylene represents a lower alkylene radical;
Y is a direct bond or a group of the formula

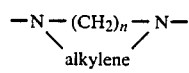

$-CH_2-$, $-CH_2-CH_2-$, $-\underset{\underset{CH_3}{|}}{N}-$ or $-\underset{\underset{CH_2-CH_2-CN}{|}}{N}-$ ;

Z is the β-hydroxyethylsulfonyl, β-chloroethylsulfonyl, β-acetoxyethylsulfonyl, β-thiosulfatoethylsulfonyl, β-phosphatoethylsulfonyl, vinylsulfonyl or β-sulfatoethylsulfonyl group
a is a number from 1 to 4;
b is a number from 0 to 3;
c is a number from 0 to 3, where a, b and c may be identical to or different from one another, but the sum of a+b+c is a maximum of 4;
m is the number 1 or 2; and
M is a hydrogen atom or an alkali metal, said process consisting essentially of: condensing a phthalocyanine sulfonyl chloride component consisting essentially of one or more compounds of the formula

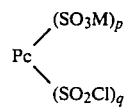

wherein Pc and M are as defined previously, p is a number from 0 to 3, and q is the same or a different number ranging from 1 to 4, provided that the sum of p + q is a maximum of 4, with an amine compound consisting essentially of an amine of the formula

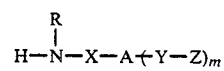

alone or in combination with an amine of the formula

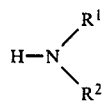

where R, X, A, Y, Z, m, $R^1$ and $R^2$ are as defined previously, in the presence of a catalyst consisting essentially of a pyridine sulfonamide or a pyridinecarboxamide or a mixture thereof.

8. The process as claimed in claim 7, wherein the sulfochloride groups of the phthalocyanine sulfonyl chloride are, simultaneously with the condensation reaction, hydrolyzed to sulfo groups, and any remaining sulfochloride groups are hydrolyzed subsequent to the condensation reaction.

9. The process as claimed in claim 7, wherein the phthalocyanine sulfonyl chloride is a compound or mixture of compounds of the formula

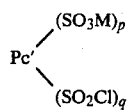

wherein p and q are as defined previously and Pc' is a metal-containing phthalocyanine, the metal being copper or nickel, and wherein the amine is a compound of the formula

wherein R and Z are as defined previously and A' is phenylene.

10. The process as claimed in claim 7, wherein the pyridinecarboxamide is a pyridinemonocarboxamide.

11. The process as claimed in claim 7, wherein the pyridinecarboxamide is nicrotinamide.

12. The process as claimed in claim 7, wherein the reaction is carried out at a temperature between 15° and 30° C.

* * * * *

UNITED STATES PATENT AND TRADEMARK OFFICE
CERTIFICATE OF CORRECTION

PATENT NO. : 4,745,187
DATED : May 17, 1988
INVENTOR(S) : Hartmut Springer

It is certified that error appears in the above-identified patent and that said Letters Patent is hereby corrected as shown below:

In claim 1, column 11, at line 10, a comma should be inserted after "thereof" and before "with".

In claim 11, column 14, at line 11, "nicrotinamide" should read --nicotinamide--.

Signed and Sealed this

Seventh Day of February, 1989

Attest:

DONALD J. QUIGG

Attesting Officer

Commissioner of Patents and Trademarks